(12) United States Patent
Moriyama et al.

(10) Patent No.: US 6,515,388 B1
(45) Date of Patent: Feb. 4, 2003

(54) MAGNETIC LEVITATION CONTROL APPARATUS

(75) Inventors: Shinichi Moriyama, Iizuka (JP); Katsuhide Watanabe, Fujisawa (JP); Takahide Haga, Fujisawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/680,954

(22) Filed: Oct. 10, 2000

(30) Foreign Application Priority Data

Dec. 13, 1999 (JP) ............................................. 11-353694

(51) Int. Cl.[7] ................................................. H02K 7/09
(52) U.S. Cl. ...................................................... 310/90.5
(58) Field of Search ........................................ 310/90.5

(56) References Cited

U.S. PATENT DOCUMENTS 5,322,144 A * 6/1994 Skalski et al. ............... 187/115
5,749,444 A * 5/1998 Skalski ........................ 187/409

* cited by examiner

*Primary Examiner*—Nestor Ramirez
*Assistant Examiner*—Guillermo Perez
(74) *Attorney, Agent, or Firm*—Wenderoth, Lind & Ponack, L.L.P.

(57) ABSTRACT

A magnetic levitation control apparatus comprises a pair of electromagnets for holding a levitated body having a magnetic body in the levitated state. A signal source for supplying a voltage signal of a frequency on a level such that enables the electromagnets to function as the position sensor, wherein a control voltage signal for controlling the magnetic attraction of the electromagnets is superimposed on the voltage signal. A circuit differentially supplies the voltage signal to the pair of electromagnets to form a position signal of the levitated body from an add signal of currents respectively from the electromagnets, and a circuit detects a control current of the electromagnets from a subtraction signal of currents respectively from the electromagnets. A controller generates a control voltage signal of the electromagnets from the detected position signal of the levitated body and, in addition, corrects the position signal detected from the detected control current of the electromagnets.

20 Claims, 4 Drawing Sheets

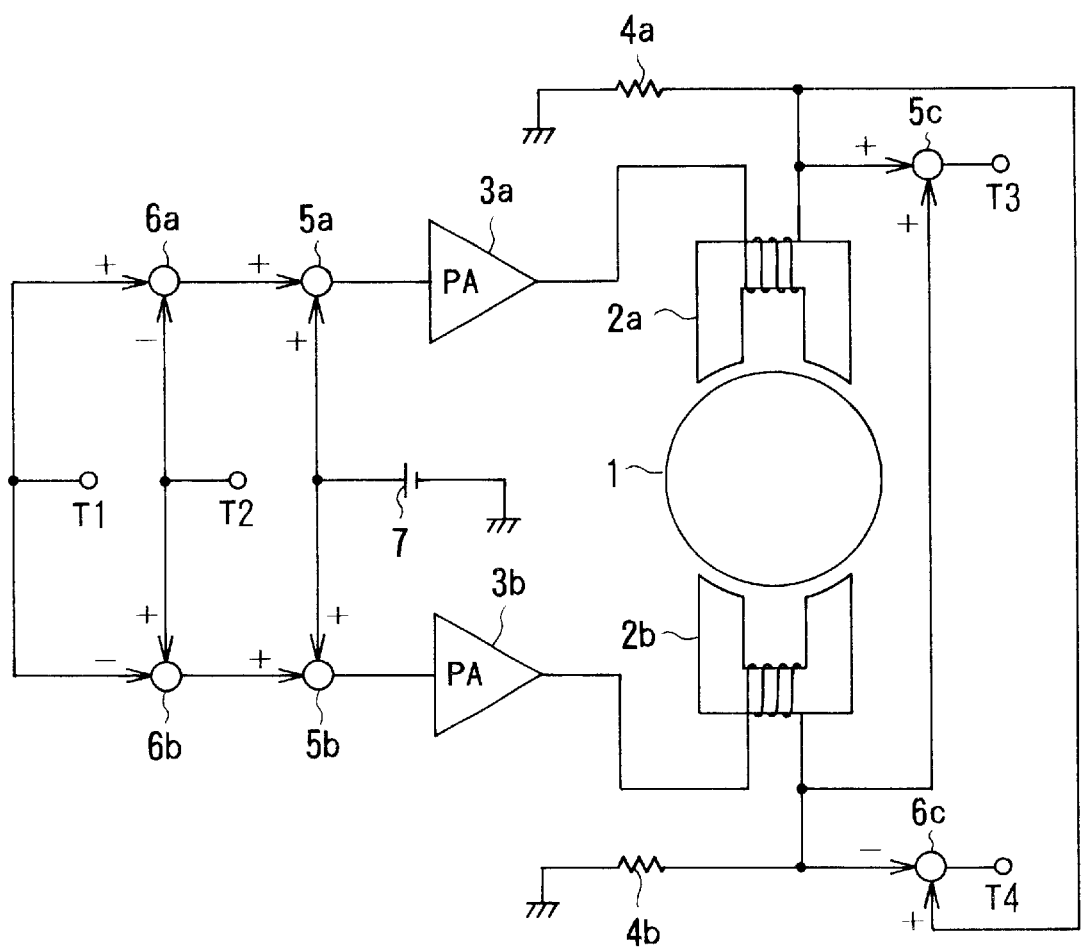
F I G. 2

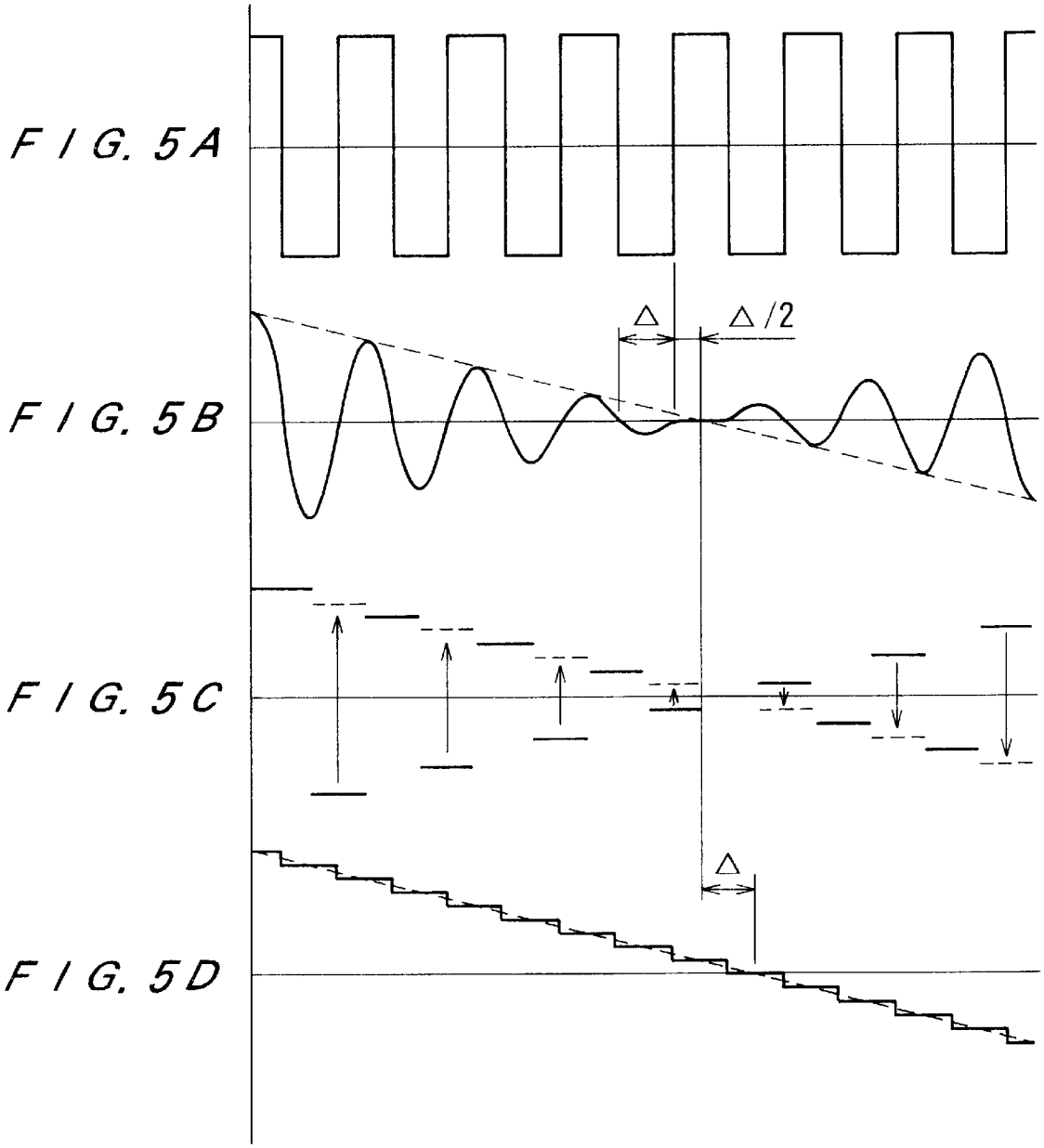

MAGNETIC LEVITATION CONTROL APPARATUS

BACKGROUND OF THE INVENTION

1. Field of the Invention

The present invention relates to a magnetic levitation control apparatus, such as a magnetic bearing or a magnetic levitation damping apparatus, and more particularly to a control apparatus for holding a levitated body having a magnetic body in a predetermined position in a non-contact manner by controlling the magnetic attraction of electromagnets.

2. Description of the Related Art

In the magnetic levitation control apparatus, a detector for detecting the position of the levitated body and a feedback control unit for controlling the magnetic attraction of the electromagnets based on the detected positional information are generally required and indispensable as a mechanism for stably holding the levitated body in a non-contact manner. One example of the construction is shown in FIG. 1. Position detection sensors 22a, 22b are a conventional sensor called a "magnetic induction system", wherein the position of the levitated body is detected in a non-contact manner by a change in inductance, and, together with balancing resistors 23a, 23b and a differential amplifier 26, constitute a bridge circuit. A carrier signal generated by an oscillator 25 and a buffer amplifier 24 is added to the bridge circuit. Upon the occurrence of unbalance of the inductance between the sensors 22a, 22b due to the displacement of the levitated body 21 from the reference position, a sensor signal having an amplitude substantially proportional to the displacement appears in the differential amplifier 26. The sensor signal contains, in a superimposed state, a noise signal included by magnetic coupling between the sensor and the electromagnets or between the sensor and other electromagnetic actuator. Therefore, a band-pass filter 27 with the frequency of the carrier signal being the central frequency is generally provided to remove the noise component.

In FIG. 1, in order to remove the carrier frequency component to extract the amplitude component only, the sensor signal passed through the band pass filter 27 is processed in a detection circuit 28, and sent as a displacement signal to a controller 29. On the other hand, electromagnets 35a, 35b are excited by a voltage control type current source comprised of differential power amplifiers 32a, 32b and current detecting resistors 34a, 34b. In general, an adder 30 and a subtracter 31 are used to supply, to the electromagnets 35a, 35b, a superimposed current composed of a bias current corresponding to the voltage of a direct-current power supply 33 and a control current corresponding to the control signal of the controller 29. This creates a difference in magnetic attraction between the electromagnets 35a, 35b. This difference cancelles the force of disturbance and the gravitational force acting on the levitated body 21, whereby the levitated body 21 is held at a predetermined levitation position.

In the above-described feedback control unit, in recent years, a large number of examples of the construction of digital controller are also found in the field of the magnetic levitation control apparatus, from the viewpoints of easiness in implementation on hardware of the control law at the time of design of a control system and the flexibility of a change in control law. As compared with the analog controller, however, the digital controller is disadvantageous in that extra delay elements in frequency response, such as a hold element in the discretization of displacement signal and a waste time element dependent upon the operation time, are included in the feedback control unit. For this reason, when feedback control with quick response is required, for example, in magnetic bearings or magnetic levitation damping apparatuses, hardware having good frequency characteristics should be constructed in the detector for detecting the position of the levitated body and the section for controlling the attraction of the electromagnets.

In recent magnetic levitation control apparatuses, attention is being drawn to the application of a sensorless magnetic levitation system wherein the levitation position is detected using electromagnets per se aiming at the utilization of the apparatus within a vacuum environment by taking advantage of non-contact bearing and a reduction in cost and a reduction in size of the whole apparatus. In this sensorless magnetic levitation system, a carrier signal is directly supplied to the electromagnets 35a, 35b without use of the sensors 22a, 22b shown in FIG. 1 in the detection of the position of the levitated body, whereby the position of the levitated body is detected based on a change in inductance of the electromagnets thereof.

This magnetic levitation system is particularly disadvantageous in that a deterioration in frequency characteristics in the position detector due to a lowering in the frequency of the carrier signal is unavoidable. This suggests that, in the magnetic levitation control apparatus utilized within the vacuum environment, from the viewpoint of vacuum contamination, a thin metallic pressure bulkhead is preferably provided between the sensor and the levitated body. In this case, however, as the frequency of the carrier signal increases, the loss in this portion increases. Therefore, the frequency of the carrier signal is preferably as low as possible. This necessarily requires the use of a carrier signal having a low frequency. The use of the carrier signal having a low frequency results in interference with the frequency band for controlling the position of the levitated body. Therefore, in order to further develop the application of the magnetic levitation technique while utilizing the advantage of the digital controller, it is necessary to take some measure for preventing the deterioration in frequency response of the feedback control unit due to a lowering in carrier frequency of the position detecting sensor.

SUMMARY OF THE INVENTION

Under the above circumferences, the present invention has been made, and it is an object of the present invention to provide a magnetic levitation control apparatus that applies self-sensing control, which utilizes electromagnets for controlling the levitation position of the levitated body, to a position detecting system for detecting the position of the levitated body and can achieve a lowering in carrier frequency without a deterioration in frequency response characteristics of the feedback control unit.

It is another object of the present invention to provide a magnetic levitation control apparatus which comprises a combination of the digital controller with the self-sensing control and can realize good controllability.

In order to attain the above objects, according to an aspect of the present invention, there is provided a magnetic levitation control apparatus comprising: a pair of electromagnets for holding a levitated body having a magnetic body in the levitated state, the pair of electromagnets being positioned opposite to each other in such a manner that the point of application of the electromagnetic attraction in the electromagnets conforms to the point of a position detected using the electromagnets as a position sensor. A signal source supplies a voltage signal of a frequency on a level such that enables the electromagnets to function as the position sensor, wherein a control voltage signal for controlling the magnetic attraction of the electromagnets is superimposed on the voltage signal. A circuit differentially supplies the voltage signal to the pair of electromagnets to form a position signal of the levitated body from an add signal of currents respectively from the electromagnets, and a circuit detects a control current of the electromagnets from a subtraction signal of currents respectively from the electromagnets. A controller generates a control voltage signal of the electromagnets from the position signal of the levitated body and, in addition, corrects the detected position signal from the detected control current of the electromagnets.

According to the magnetic levitation control apparatus of the present invention, lowering the carrier (signal source) frequency in the detection of the position of the levitated body can be realized by synchronous detection operation synchronous with the carrier (signal source) signal through the controller. Therefore, even though the frequency band in the operation for detecting the position of the levitated body overlaps with the frequency band in the operation for controlling the levitation position of the levitated body, both operations can be successfully performed without any problem and the position of the levitated body with a relatively high frequency can be detected using even a low frequency signal source.

The self-synchronous detection system does not require a filter for removing the carrier frequency component in the detection of amplitude, and, thus, in principle, the delay of the response of the feedback control system is governed by the sample/hold element and the delay element inherent in the controller used. That is, the discrete value control system can be designed with ignoring the delay of response in the detection of position. Further, the frequency of the carrier signal is necessarily limited to several kHz in consideration of the performance of commercially available digital signal processor boards. This is suitable for self-sensing control.

Since the position detection of the levitated body is carried out by means of electromagnets used in the control of levitation position of the levitated body, the point of application of the magnetic attraction conforms to the point of the detected position. This makes it possible to perform accurate control and, at the same time, to correct the position signal detected from the control current of the electromagnets while taking into consideration, for example, the influence of the magnetic saturation. Therefore, the accuracy of the detection of the position of the levitated body can be enhanced. In general, according to the present invention, since individual sensors for the detection of position are not required, a simple structure can be provided, and a high level of levitation position control can be realized using a simple construction of control circuit.

The above and other objects, features, and advantages of the present invention will be apparent from the following description when taken in conjunction with the accompanying drawings which illustrates preferred embodiments of the present invention by way of example.

BRIEF DESCRIPTION OF THE DRAWINGS

FIG. 2 is a diagram showing the construction of an electromagnet drive system in the magnetic levitation control apparatus according to a first embodiment of the present invention;

FIG. 5 is a waveform diagram illustrating the operation of synchronous detection by means of a digital controller.

DESCRIPTION OF THE PREFERRED EMBODIMENTS

Figure 1:
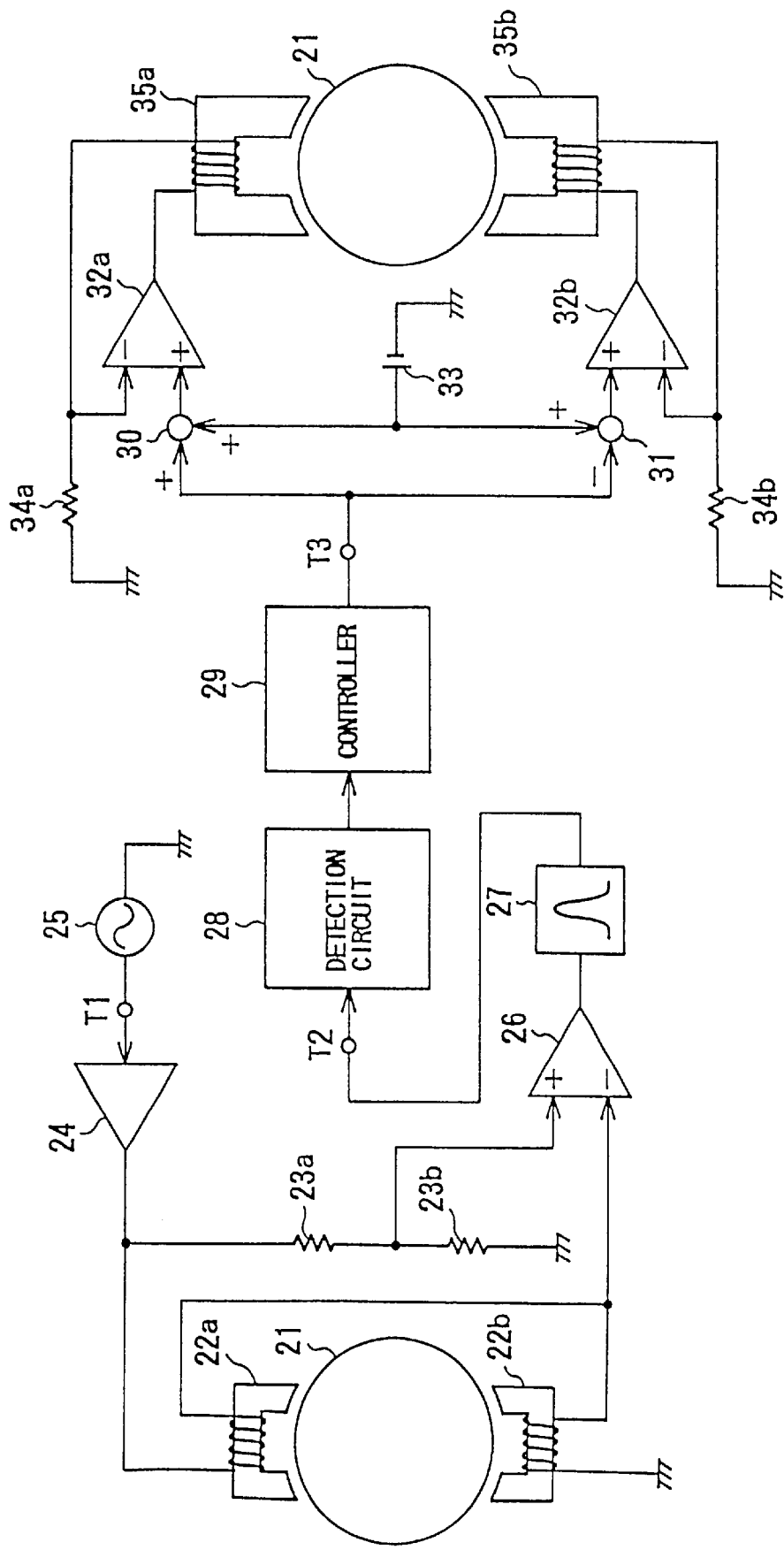
FIG. 1 is a block diagram showing general construction of a conventional magnetic levitation control apparatus.

Embodiments of the present invention will be described with reference to the accompanying drawings.

The first embodiment of the present invention will be described in conjunction with FIGS. 2 and 3.

According to this magnetic levitation control apparatus, a pair of electromagnets 2a, 2b for holding a levitated body 1 having a magnetic body in the levitated state are positioned opposite to each other in such a manner that the point of application of the magnetic attraction in the electromagnets 2a, 2b conforms to the point of a position detected using the electromagnets as a position sensor.

A signal source for supplying a voltage signal of a frequency on a level such that enables the electromagnets 2a, 2b to function as the position sensor, is formed in a digital signal processor 10, and the signal is supplied to a terminal T2 through a digital-to-analog converter 8b, a band-pass filter 12b, and an all-pass filter 14. Here the carrier frequency generated in the digital signal processor 10 is, for example, about several kHz. On the other hand, a control voltage signal for controlling the magnetic attraction of the electromagnets 2a, 2b is formed in the digital signal processor 10, and supplied through a digital-to-analog converter 8a to a terminal T1. The carrier frequency (voltage) signal and the control voltage signal are superimposed on each other in subtracters 6a, 6b, and differentially supplied through power amplifiers 3a, 3b to the electromagnets 2a, 2b. A bias voltage from a direct-current power source 7 is superimposed on the above signals in adders 5a, 5b.

These voltage signals are power amplified in power amplifiers 3a, 3b and then supplied to the electromagnets 2a, 2b, and the magnitudes of currents flowing through the electromagnets 2a, 2b are detected with resistors 4a, 4b. The currents of both the electromagnets are added in an adder 5c to provide an add signal which is then sent to a terminal T3. Likewise, the currents of both the electromagnets are subtracted in a subtracter 6c to provide a subtraction signal which is then sent to a terminal T4. The add signal (T3) obtained by adding the currents of the electromagnets 2a, 2b is passed through the band-pass filter 12a, the amplifier 13, and the analog-to-digital converter 9a, and synchronously detected in the digital signal processor 10 to obtain a position signal of the levitated body. Likewise, the subtraction signal (T4) of the currents of the electromagnets 2a, 2b is passed through the analog-to-digital converter 9b and synchronously detected in the digital signal processor to obtain the magnitude of a control current for controlling the levitation position of the electromagnets.

That is, this magnetic levitation control apparatus has a digital controller 11 for controlling the levitation position of the levitated body through the utilization of the magnetic attraction of the electromagnets 2a, 2b. The digital controller 11 simultaneously generates a carrier signal necessary for detecting the position of the levitated body 1 and a position control signal necessary for controlling the position of the levitated body 1. These signals are sent through the digitalto-analog converters 8a, 8b to the electromagnets 2a, 2b, and current signals of the electromagnets 2a, 2b are passed through the analog-to-digital converters 9a, 9b and again input into the digital signal processor 10 in the digital controller 11. The controller performs synchronous detection of the current signals to detect the position of the levitated body 1 through the utilization of the electromagnets 2a, 2b as a sensor for detecting the position of the levitated body. At the same time, based on the results of the position detection on the levitated body 1, the digital signal processor 10 generates a position control signal which is then converted to an analog signal in the digital-to-analog converter 8a, and sent through the power amplifier 3a, 3b to the electromagnets 2a, 2b. That is, the digital signal processor 10 simultaneously performs the position detection of the levitated body 1 by synchronous detection based on the self-generated carrier signal and the position control of the levitated body 1.

Figure 3:
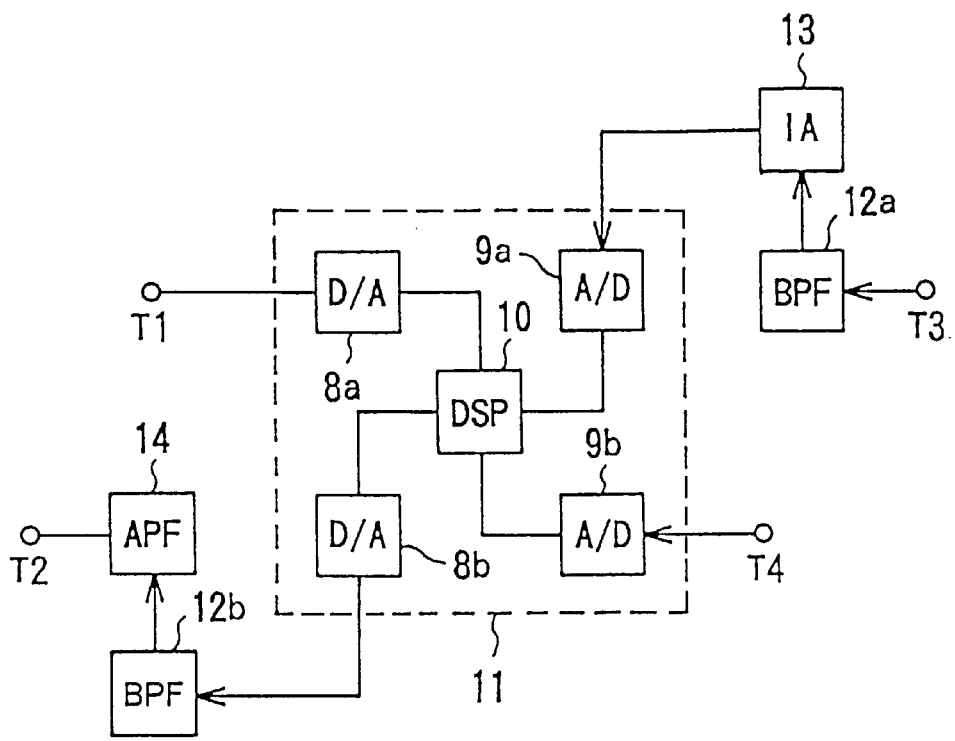
FIG. 3 is a diagram showing the construction of a digital controller of the magnetic levitation control apparatus shown in FIG. 2.

The electromagnet drive system for self-sensing control and the digital controller for the system shown in FIGS. 2 and 3 has the following constructional features.

First, the carrier signal for generating a high frequency current is generated based on a rectangular wave signal of a sign changed data for each sampling output from the digital-to-analog converter 8b in the digital signal processor 10. This rectangular wave signal is converted to a sine-wave signal through the narrow-band band-pass filter 12b and the all-pass filter 14, and then supplied to the drive system of the electromagnets 2a, 2b through a terminal T2.

Second, the carrier signal is provided in a polarity opposite to the power amplifiers 3a, 3b. Consequently, a difference in high frequency (carrier signal frequency) currents, together with a bias current, appears at the output of the adder 5c, while the sum of high frequency (carrier signal frequency) currents, together with a control current, appears at the output of the subtracter 6c.

Third, the bias current contained in the add signal from the adder 5c can be cut by a broad-band band-pass filter 12a. Therefore, a difference signal of high frequency currents with a very small delay against the amplitude appears at the output of an instrumentation amplifier 13. This difference signal is synchronous with the sampling operation of the digital signal processor 10, and thus can be directly introduced into the analog-to-digital converter 9a. Likewise, the sum of high frequency currents contained in the subtraction signal from the subtracter 6c is also in a synchronized state, and, thus, the subtraction signal can be introduced directly into the digital signal processor 10 through the analog-to-digital converter 9b.

According to the self-synchronous detection system, the amplitude detection of the difference signal of the high frequency currents can be realized through a simple algorithm of the digital signal processor 10. Since the phase of the high frequency currents can be regulated by the all-pass filter 14, the analog-to-digital converter 9a can sample the peak value of the difference signal. Therefore, changing the sign of the sample date for each sampling permits data on peak detection, that is, data on positional displacement, to be automatically provided.

On the other hand, the amplitude of the add signal of the high frequency currents is approximately constant independently of the positional displacement, and, thus, the subtraction signal of the electromagnets 2a, 2b currents introduced into the converter 9b is sampled in a waveform such that the control current is fluctuated in a given amplitude for each sampling. Therefore, the addition to the sample data for each sampling can cancel the fluctuation, thereby providing control current data.

For the data on the positional displacement, the control current contains an error derived from a change in coefficient of self-induction which can be corrected by the data on control current. The correction effect can be attained by a simple subtraction algorithm. The correction is also possible when the analog controller is used. Specifically, for electromagnets used in self-sensing control, unlike conventional induction position sensors, a control current flows. In general, in the case of core coils in sensors or electromagnets, the coefficient of self-induction changes according to the magnetic flux density within the core, even when magnetic saturation does not occur. Upon a change in magnetic flux density within the core of the electromagnets according to the control current, the amplitude of the difference signal of the high frequency currents also changes. This unfavorably results in an estimation as if the levitated body is being displaced. This problem can be solved by the correction of the position signal based on the control current.

Figure 4:
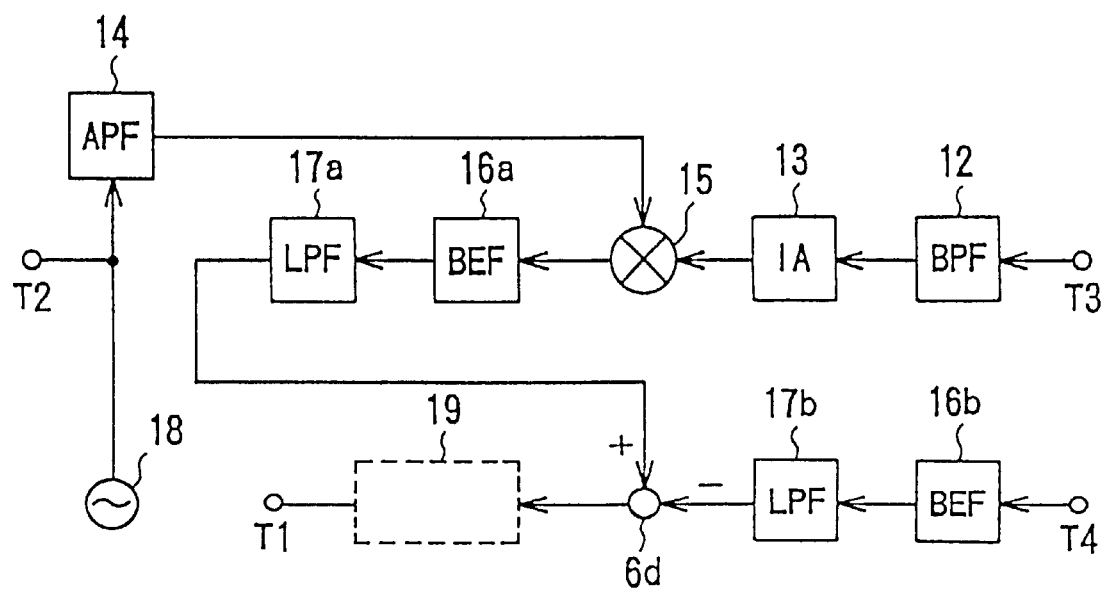
FIG. 4 is a block diagram showing the principal part of the magnetic levitation control apparatus according to a second embodiment of the present invention.

FIG. 4 shows the second embodiment of the present invention, wherein the positional displacement is estimated by an analog detection system and control is performed by means of an analog controller. An add signal of currents of electromagnets 2a, 2b obtained in an adder 5c is passed through a band-pass filter 12 to cut the control current, and amplified by an instrumentation amplifier 13 to provide a difference signal of high frequency currents (showing the results on positional displacement of the levitated body 1). This difference signal is multiplied, in a multiplier 15, by a high frequency current from an alternating voltage source 18 which has been regulated by an all-pass filter 14 so as to provide an identical phase. The resultant product is further passed through a band elimination filter 16a and a low-pass filter 17a to perform amplitude detection, thereby providing a position signal of the levitated body 1. On the other hand, a subtraction signal of currents of the electromagnets 2a, 2b are passed through a band elimination filter 16b and a low-pass filter 17b of the same type as described above to remove the high frequency current component, and the signal is then supplied as a correction value of the control current to the subtracter 6d. The detection signal after the correction is supplied as a positional displacement signal to the analog controller 19.

Next, a specific method for automatically detecting the position of a levitated body within a digital controller will be described. At the outset, a carrier signal is generated as a rectangular wave, with the period being twice the sampling time, by outputting sign changed data from the digital-to-analog converter for each sampling in the digital signal processor. When the performance of commercially available digital signal processor boards is taken into consideration, the frequency of the rectangular wave signal is lower by one order than the carrier frequency of commonly used position detecting sensors. On the other hand, a signal output from a bridge circuit including a sensor is passed through a band-pass filter, and then directly introduced as a sensor signal into the analog-to-digital converter. The operation of the digital-to-analog conversion is synchronous with the operation of the analog-to-digital conversion, and the time delay between both the operations can be set to any desired value. Therefore, the sensor signal can be always sampled at the peak time. Thus, when the digital signal processor performs sign change for each sampling to process input data, synchronous detection is automatically performed. Consequently, data on displacement of the levitated body can be obtained.

Frequency characteristics in the synchronous detection operation are substantially determined by delay elements inherent in the digital controller. Therefore, the carrier frequency can be lowered without a deterioration in the frequency response of the feedback control system. In ordinary magnetic levitation control apparatuses provided with a position detecting sensor, the displacement data is converted to feedback correction data, based on a suitable control algorithm within the digital signal processing apparatus, which is sent as a control signal by another digital-to-analog converter. In sensorless magnetic levitation control apparatuses using a current detecting sensor, the control signal is superimposed on the carrier signal, and the superimposed signal can be sent by a single digital-to-analog converter. In this respect, the magnetic levitation control apparatus according to the present invention can be said to be a magnetic levitation control system which can fully utilize the advantage of the digital controller. As described above, this synchronous detection system may also be constructed using an analog circuit.

FIG. 5 shows an embodiment of signal waveform in each terminal and the synchronous detection operation in a digital signal processing apparatus. At the outset, a carrier signal is generated as a rectangular wave signal, with the period being twice (2Δ) the sampling time Δ, by outputting, from the digital-to-analog converter, sign changed data for each sampling time Δ in the digital signal processing apparatus. This rectangular wave signal is supplied as a carrier signal to the power amplifier. The rectangular wave output voltage of the power amplifier is supplied to excitation coils of the electromagnets 2a, 2b. A change in inductance due to the displacement of the levitated body appears as a change in output current in the resistors 4a, 4b which is then input into the terminal T3.

The signal output from the terminal T3 is passed through the band-pass filter 12a and the amplifier 13, and then introduced as a sensor signal directly into the analog-to-digital converter 9a. The operation of the digital-to-analog conversion is synchronous with the operation of the analog-to-digital conversion, and the time delay between both the operations can be set to any desired value. Therefore, the sensor signal can be always sampled at the peak time. Thus, when the digital signal processing apparatus performs sign change for each sampling to process input data, synchronous detection is automatically performed. Consequently, data on displacement of the levitated body can be obtained.

That is, the output of the amplifier 13 is supplied, to the analog-to-digital converter 9a, as a sensor signal composed mainly of a fundamental wave component with the frequency being ½ Δ by the higher harmonic wave damping effect of the band-pass filter 12a. The solid line in FIG. 5B represents a sensor signal when the levitated body is linearly moved downward from a position deviated above from the reference position by the force of turbulence. The dotted line in FIG. 5B represents the amplitude component and corresponds to the displacement of the levitated body.

At that time, when a time delay of Δ/2 has been set between the operation of the analog-to-digital conversion and the operation of the digital-to-analog conversion, as indicated by a solid line in FIG. 5C, the sensor signal is sampled at the peak time. When this sample data is sign changed for each sampling, as indicated by an arrow and a dotted line in FIG. 5C, the sign of data is alternately changed. As a result, synchronous detection is carried out with respect to the amplitude component shown in FIG. 5B to provide data on the displacement of the levitated body 1 as shown in FIG. 5D.

The displacement data thus obtained is processed within the digital signal processing apparatus 11 according to a suitable control algorithm, and is sent, to the terminal T1, as a control voltage signal corresponding to the current of the electromagnets by the digital-to-analog converter 8a.

What is important to the sensorless magnetic levitation control apparatus of signal superimposition type is that, when the frequency of the carrier signal is excessively high, the high frequency current cannot be flowed through the electromagnets 2a, 2b. Lowering the carrier frequency is also necessary from the viewpoint of the signal-to-noise ratio in the detection of current. Also in this respect, signal processing using the digital signal processing apparatus 11 is useful. It is needless to say that, in the above embodiments, although a pair of electromagnets 2a, 2b are used in the synchronous detection system using the digital controller, in fact, more than a pair of electromagnets are used.

As described above, the present invention has the following excellent effects.

An add signal and a subtraction signal are generated from current signals of a pair of electromagnets, and a carrier signal current for detecting the position and a control current for controlling the position are processed separately from each other to correct the detected position of the levitated body through a control current. Therefore, an estimation error of the positional displacement, which is a problem in self-sensing control, can be significantly reduced, and the estimation accuracy is substantially the same as that in the case of the self-induction position sensor.

Further, since the digital controller has a self-sensing control function of self-synchronous detection type, the response of the position detection system can be significantly improved. Therefore, a high level of magnetic levitation control, such as damping control of a levitated body by a digital controller, can be realized.

Moreover, also when an analog controller is used, the present invention contributes to an improvement in technology of self-sensing control from the viewpoint of estimation accuracy of the positional displacement. The self-sensing can aim at low cost through a reduction in the number of elements for constituting devices associated with the sensor in addition to the above advantages. When this is the principal objective, the magnetic levitation control apparatus using an analog controller according to the present invention is useful.

Although certain preferred embodiments of the present invention have been shown and described in detail, it should be understood that various changes and modifications may be made therein without departing from the scope of the appended claims.

What is claimed is:

1. A magnetic levitation control apparatus, comprising:
   a digital controller for controlling the levitation position of a levitated body through the utilization of magnetic attraction of electromagnets;
   said digital controller generating a carrier signal and a position control signal necessary for detecting the position and controlling the position of the levitated body, the carrier signal and the position control signal being sent through a digital-to-analog converter arrangement to the electromagnets, a current signal from the electromagnets being input through an analog-to-digital converter arrangement to the digital controller, synchronous detection of the current signal from the electromagnets being performed by the controller to utilize the electromagnets as a position detecting sensor for detecting the position of the levitated body; and a position control signal being generated by the controller based on the results of the position detection, converted to an analog signal by the digital-to-analog converter, and sent through a power amplifier to the electromagnets, whereby the position detection and the position control are simultaneously performed.

2. A magnetic levitation control apparatus according to claim 1, wherein the position of the levitated body is detected in such a manner that a rectangular wave signal of a sign changed data for each sampling time ($\Delta$) is supplied as a carrier signal through the digital-to-analog converter to the electromagnets, a current signal of the electromagnets corresponding to the rectangular wave is again supplied to the digital controller, sampling is performed at a peak time of the current signal, and the sampling data is sign changed and processed for each sampling to provide data on the position of the levitated body.

3. A magnetic levitation control apparatus comprising:
a pair of electromagnets for holding a levitated body having a magnetic body in the levitated state, the pair of electromagnets being positioned opposite to each other in such a manner that the point of application of the magnetic attraction in the electromagnets conforms to the point of a position detected using the electromagnets as a position sensor;
a signal source for supplying a voltage signal of a frequency on a level that enables the electromagnets to function as the position sensor, wherein a control voltage signal for controlling the magnetic attraction of the electromagnets is superimposed on the voltage signal;
a circuit for differentially supplying the voltage signal to the pair of electromagnets to form a position signal of the levitated body from an add signal of currents respectively output from the electromagnets, and a circuit for detecting a control current of the electromagnets from a subtraction signal of currents respectively output from the electromagnets; and
a controller which generates a control voltage signal of the electromagnets from the detected position signal of the levitated body and, in addition, corrects the position signal detected from the detected control current of the electromagnets.

4. A magnetic levitation control apparatus according to claim 3, wherein input data of the subtraction signal is subjected to add-averaging processing with a preceding sample data for each sampling to provide a control current of the electromagnets, and input data of the add signal is sign changed for each sampling to provide a position signal of the levitated body.

5. A magnetic levitation control apparatus according to claim 3, wherein an estimation error on positional displacement caused by a fluctuation in magnetic flux density within the core in the electromagnets with respect to the position signal is corrected by the control current.

6. A magnetic levitation control apparatus according to claim 3, wherein the controller is a digital controller, and the voltage signal of the signal source is generated by the digital controller.

7. A magnetic levitation control apparatus according to claim 3, wherein the controller is an analog controller.

8. A magnetic levitation control apparatus for use with an electromagnet to controllably levitate a body, said magnetic levitation control apparatus comprising:
a controller for controlling the electromagnet so as to control a levitation position of the body;

wherein said controller is operable to generate a control signal for controlling the levitation position of the body and to generate a carrier signal to be input to the electromagnet to cause the electromagnet to output a current signal as a feedback to said controller; and
wherein said controller is operable to modify the control signal based on the current signal output from the electromagnet.

9. The magnetic levitation control apparatus of claim 8, wherein said controller comprises a first converter arrangement operable to send the control signal and the carrier signal to the electromagnet and a second converter arrangement arranged to receive the current signal from the electromagnet and operable to convert the current signal to a converted current signal.

10. The magnetic levitation control apparatus of claim 9,
wherein said first converter arrangement comprises a first digital-to-analog converter that is operable to convert the carrier signal into an analog carrier signal and to send the analog carrier signal to the electromagnet and a second digital-to-analog converter that is operable to convert the control signal into an analog control signal and to send the analog control signal to the electromagnet,
wherein the current signal comprises a current position signal and a current controlling signal, and
wherein said second converter arrangement comprises a first analog-to-digital converter that is arranged to receive the current position signal from the electromagnet to generate a digital current position signal and a second analog-to-digital converter that is arranged to receive the current controlling signal from the electromagnet to generate a digital current controlling signal.

11. The magnetic levitation control apparatus of claim 9, further comprising a power amplifier arrangement operable to amplify at least one of the control signal, the carrier signal and the current signal.

12. The magnetic levitation control apparatus of claim 11, wherein said amplifier arrangement comprises a first amplifier configuration operable to amplify the control signal and the carrier signal and a second amplifier configuration operable to amplify the current signal.

13. The magnetic levitation control apparatus of claim 12, wherein said first amplifier configuration comprises a first amplifier operable to amplify the control signal and a second amplifier operable to amplify the carrier signal.

14. The magnetic levitation control apparatus of claim 8,
wherein said controller is operable to generate a rectangular wave signal of a sign changed data for each sampling time ($\Delta$) as the carrier signal,
wherein said controller is operable to sample the current signal at a peak time of the current signal to obtain sampled data, to sign change the sampled data and process the sign changed sampled data to provide position data of the body.

15. A magnetic levitation control apparatus comprising:
a signal source for supplying a position voltage signal and a control voltage signal superimposed on the position voltage signal;
a differential circuit arranged to receive the position voltage signal and the control voltage signal;
a plurality of electromagnets arranged to differentially receive the position voltage signal and the control voltage signal from said differential circuit, said plurality of electromagnets being operable to hold a body at a position without contacting the body in response to a received differential control voltage signal, respectively, each of said plurality of electromagnets being operable to output a detected position signal, respectively, corresponding to the position of the body relative thereto in response to receipt of a differential position voltage signal, said plurality of electromagnets being positioned such that a magnetic attraction in said plurality of electromagnets corresponds to the position of the body;

a detecting circuit operable to receive the detected position signals from said electromagnets and to output a control current based on the detected position signals; and a controller arranged to receive the control current, said controller being operable to control the signal source to modify the control voltage signal based on the control current and operable to control the signal source to modify the position voltage signal based on the control signal.

16. The magnetic levitation control apparatus of claim 15, wherein said plurality of electromagnets comprise two electromagnets arranged to oppose each other with the body disposed therebetween.

17. The magnetic levitation control apparatus of claim 16, further comprising a current subtractor operable to subtract an output current from each electromagnet and to output a subtraction signal.

18. The magnetic levitation control apparatus of claim 17, further comprising an adder operable to add each of the detected position signals to generate an added detected position signal, wherein said controller is operable to sample data of the subtraction signal and add-average process the sampled data with a preceding sample data to generate a control instruction signal to instruct the signal source to modify the control voltage signal, wherein said controller is operable to sample data of the added detected position signal and sing change each sampled data to generate a position signal of the body.

19. The magnetic levitation control apparatus of claim 15, wherein said controller comprises a digital controller.

20. The magnetic levitation control apparatus of claim 15, wherein said controller comprises an analog controller.

* * * * *